US012619368B2

(12) United States Patent
Horspool et al.

(10) Patent No.: US 12,619,368 B2
(45) Date of Patent: May 5, 2026

(54) SYSTEMS AND METHODS FOR AUTOMATIC ISOLATION OF WRITE DATA IN NON-VOLATILE STORAGE DEVICES

(71) Applicant: Kioxia Corporation, Tokyo (JP)

(72) Inventors: Nigel David Horspool, Great Missenden (GB); Brian Hatfield Clarke, Berks (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/817,341

(22) Filed: Aug. 28, 2024

(65) Prior Publication Data

US 2026/0064296 A1 Mar. 5, 2026

(51) Int. Cl.
*G06F 3/06* (2006.01)

(52) U.S. Cl.
CPC ............ *G06F 3/064* (2013.01); *G06F 3/0616* (2013.01); *G06F 3/0679* (2013.01)

(58) Field of Classification Search
CPC ....... G06F 3/064; G06F 3/0616; G06F 3/0679
See application file for complete search history.

(56) References Cited

U.S. PATENT DOCUMENTS

| | | | | |
|---|---|---|---|---|
| 2022/0188039 A1* | 6/2022 | Kanno | ................. | G06F 3/0659 |
| 2023/0176743 A1* | 6/2023 | Dalmatov | ............. | G06F 3/0679 |
| | | | | 711/102 |
| 2023/0297262 A1* | 9/2023 | Sasaki | .................. | G06F 3/0679 |
| | | | | 711/154 |

* cited by examiner

*Primary Examiner* — Francisco A Grullon
(74) *Attorney, Agent, or Firm* — Foley & Lardner LLP

(57) ABSTRACT

A storage device may include a controller and a non-volatile memory (NVM) that includes a plurality of blocks grouped into a plurality of superblocks including a first superblock and a second superblock. The controller may receive from a host, a first write command to write first data and a second write command to write second data, and determine a lifetime of the first data and a lifetime of the second data. The lifetime of write data may indicate a duration between a time of initially storing the write data in the NVM and a time of overwriting or deleting the write data from the NVM. The controller may determine that a difference between the first lifetime and the second lifetime is greater than a threshold, and program the first data to the first superblock and the second data to the second superblock that is different from the first superblock.

20 Claims, 5 Drawing Sheets

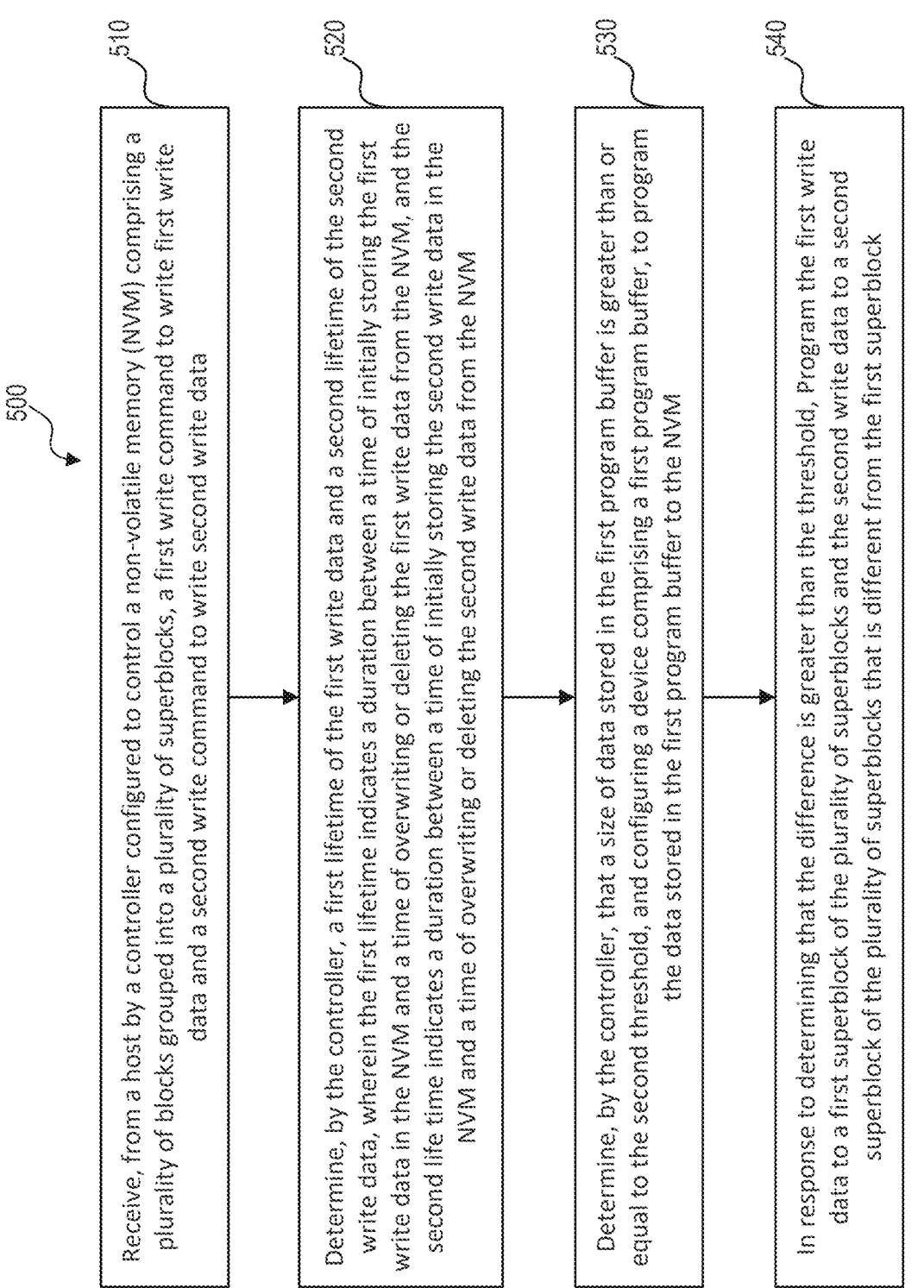

500

510

Receive, from a host by a controller configured to control a non-volatile memory (NVM) comprising a plurality of blocks grouped into a plurality of superblocks, a first write command to write first write data and a second write command to write second write data

520

Determine, by the controller, a first lifetime of the first write data and a second lifetime of the second write data, wherein the first lifetime indicates a duration between a time of initially storing the first write data in the NVM and a time of overwriting or deleting the first write data from the NVM, and the second life time indicates a duration between a time of initially storing the second write data in the NVM and a time of overwriting or deleting the second write data from the NVM

530

Determine, by the controller, that a size of data stored in the first program buffer is greater than or equal to the second threshold, and configuring a device comprising a first program buffer, to program the data stored in the first program buffer to the NVM

540

In response to determining that the difference is greater than the threshold, Program the first write data to a first superblock of the plurality of superblocks and the second write data to a second superblock of the plurality of superblocks that is different from the first superblock

FIG. 5

SYSTEMS AND METHODS FOR AUTOMATIC ISOLATION OF WRITE DATA IN NON-VOLATILE STORAGE DEVICES

TECHNICAL FIELD

The arrangements described herein relate generally to automatically isolating write data in a non-volatile memory (NVM), and more particularly to directing write data to different superblocks in the NVM based on types and/or lifetime of the write data.

BACKGROUND

A non-volatile memory storage device such as Solid State Drive (SSD) may include superblock structures each created by arranging physical blocks from different dies (e.g., NAND flash dies or NAND dies) or different planes of the dies as a single structure to increase performance by allowing concurrent writing and reading to many die which increases the write (and read) bandwidth that the SSD can support, and also to decrease the overall system error rate. Such a superblock is commonly referred to as a Redundant Arrays of Independent Disk (RAID) structure as the constituent blocks share similarities with redundancy techniques (e.g., RAID5 or RAID6). Superblocks may be commonly used for enterprise and datacenter implementations, as well as in multi-tenant environments.

Modern SSDs can perform garbage collection by moving valid user data (referred to as "reclaim data") from NAND superblocks to different NAND blocks to generate superblocks that are empty (e.g., superblocks that are garbage collected). In one aspect, write amplification is an undesirable phenomenon associated with flash memory and SSDs where the actual amount of information physically written to the storage media is a multiple of the logical amount intended to be written. For example, if an SSD stores different types of host data into a single open NAND superblock, data with a particular type may be overwritten or deleted while data with other types remaining in the superblock. As a result, garbage collection may be performed to reclaim lots of valid data (e.g., the data with other types), thereby causing high write amplification and significantly reducing write performance.

SUMMARY

The present arrangements relate to systems and methods for directing write data to different superblocks in the NVM based on types and/or lifetime of the write data.

According to some arrangements, a storage device may include a non-volatile memory (NVM) and a controller. The NVM may include a plurality of blocks grouped into a plurality of superblocks. The plurality of superblocks may include a first superblock and a second superblock. The controller may be configured to receive from a host, a first write command to write first write data and a second write command to write second write data. The controller may be configured to determine a first lifetime of the first write data and a second lifetime of the second write data. The first lifetime may indicate a duration between a time of initially storing the first write data in the NVM and a time of overwriting or deleting the first write data from the NVM, and the second lifetime may indicate a duration between a time of initially storing the second write data in the NVM and a time of overwriting or deleting the second write data from the NVM. The controller may be configured to determine that a difference between the first lifetime and the second lifetime is greater than a threshold. In response to determining that the difference is greater than the threshold, the controller may be configured to program the first write data to the first superblock and the second write data to the second superblock that is different from the first superblock.

According to some arrangements, a method may include receiving, from a host by a controller configured to control a non-volatile memory (NVM) including a plurality of blocks grouped into a plurality of superblocks, a first write command to write first write data and a second write command to write second write data. The method may include determining, by the controller, a first lifetime of the first write data and a second lifetime of the second write data. The first lifetime may indicate a duration between a time of initially storing the first write data in the NVM and a time of overwriting or deleting the first write data from the NVM, and the second lifetime may indicate a duration between a time of initially storing the second write data in the NVM and a time of overwriting or deleting the second write data from the NVM. The method may include determining, by the controller, that a difference between the first lifetime and the second lifetime is greater than a threshold. The method may include in response to determining that the difference is greater than the threshold, programming the first write data to a first superblock of the plurality of superblocks and the second write data to a second superblock of the plurality of superblocks that is different from the first superblock.

BRIEF DESCRIPTION OF THE DRAWINGS

These and other aspects and features of the present arrangements will become apparent to those ordinarily skilled in the art upon review of the following description of specific arrangements in conjunction with the accompanying figures, wherein:

FIG. 5 is a flowchart illustrating an example method for automatically isolating write data in a storage device, according to some arrangements.

DETAILED DESCRIPTION

Some arrangements in the present disclosure relate to techniques for directing (or storing) write data to different superblocks in the NVM based on types and/or lifetime of the write data. In some arrangements, a storage device (e.g., SSD) may include a non-volatile memory (NVM) and a controller (e.g., system-on-chip (SoC) controller). The NVM may include a plurality of blocks grouped into a plurality of superblocks. The plurality of superblocks may include a first superblock and a second superblock. The controller may be configured to receive from a host, a first write command to write first write data and a second write command to write second write data. The controller may be configured to determine a first lifetime of the first write data and a second lifetime of the second write data. The first lifetime may indicate a duration between a time of initially storing the first write data in the NVM (e.g., in a superblock) and a time of overwriting or deleting the first write data from the NVM (e.g., from that superblock), and the second lifetime may indicate a duration between a time of initially storing the second write data in the NVM (e.g., in a superblock) and a time of overwriting or deleting the second write data from the NVM (e.g., from that superblock). The controller may be configured to determine that a difference between the first lifetime and the second lifetime is greater than a threshold. In response to determining that the difference is greater than the threshold (e.g., the first lifetime is different from the second lifetime), the controller may be configured to program the first write data to the first superblock and the second write data to the second superblock that is different from the first superblock.

Figure 1:
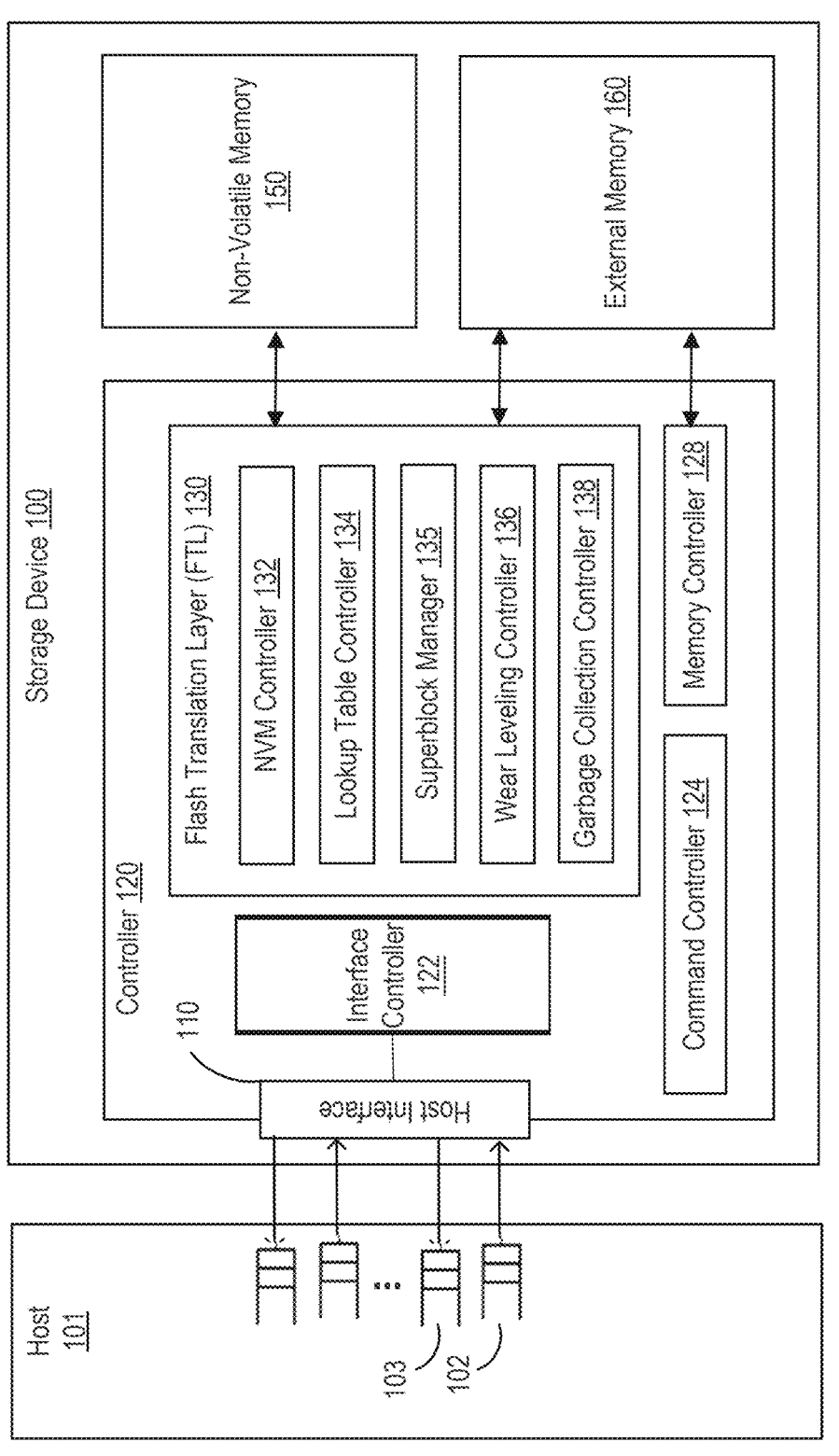
FIG. 1 shows a block diagram of an example system including a storage device coupled to a host according to some implementations.

FIG. 1 shows a block diagram of an example system including a storage device (e.g., SSD) coupled to a host according to some implementations. Referring to FIG. 1, a system (e.g., computer system) may include a host 101 and an SSD 100, which is a storage device and may be used as a main storage of an information processing apparatus (e.g., the host 101). The SSD 100 may be incorporated in the information processing apparatus or may be connected to the information processing apparatus via a cable or a network.

The host 101 may be an information processing apparatus (computing device) that accesses the SSD 100. The host 101 may be a server (storage server) that stores a large amount of various data in the SSD 100, or may be a personal computer. The host 101 includes a file system used for controlling file operation (e.g., creating, saving, updating, or deleting). For example, ZFS, Btrfs, XFS, ext 4, or NTFS may be used as the file system. Alternatively, a file object system (e.g., Ceph Object Storage Daemon) or a key value store system (e.g., RocksDB) may be used as the file system.

In some examples, the host 101 can be a user device operated by a user. The host 101 may include an Operating System (OS), which is configured to provide a file system and applications that use the file system. The file system communicates with the storage device 100 (e.g., a controller 120 of the storage device 100) over a suitable wired or wireless communication link or network to manage storage of data in the storage device 100.

In that regard, the file system of the host 101 sends data to and receives data from the storage device 100 using a suitable host interface 110 of the storage device 100. The host interface 110 allows the software (e.g., the file system) of the host 101 to communicate with the storage device 100 (e.g., the controller 120). While the host interface 110 is conceptually shown as a block between the host 101 and the storage device 100, the host interface 110 can include one or more controllers, one or more namespaces, ports, transport mechanisms, and connectivity thereof. To send and receive data, the software or file system of the host 101 communicates with the storage device 100 using a storage data transfer protocol running on the host interface 110. Examples of the protocol include but are not limited to, the Serial Attached Small Computer System Interface (SAS), Serial AT Attachment (SATA), and Non-Volatile Memory Express (NVMe) protocols. The host interface 110 includes hardware (e.g., controllers) implemented on the host 101, the storage device 100 (e.g., the controller 120), or another device operatively coupled to the host 101 and/or the storage device 100 via one or more suitable networks. The host interface 110 and the storage protocol running thereon also includes software and/or firmware executed on the hardware.

Some storage data transfer protocols (e.g., NVMe) can support one or more submission queues (e.g., submission queue 102) and one or more completion queues (e.g., completion queue 103) in a host. For example, referring to FIG. 1, the host 101 can write data (as a queue entry) to the submission queue 102 and trigger a doorbell register when commands are ready to execute. The controller 120 can then pick up the queue entries in the receiving order or in the order of priority. The completion queue 103 can indicate/ post the status for completed commands (e.g., completed write commands).

In some examples, the storage device 100 is located in a datacenter (not shown for brevity). The datacenter may include one or more platforms, each of which supports one or more storage devices (such as but not limited to, the storage device 100). In some arrangements, the storage devices within a platform are connected to a Top of Rack (TOR) switch and can communicate with each other via the TOR switch or another suitable intra-platform communication mechanism. In some arrangements, at least one router may facilitate communications among the storage devices in different platforms, racks, or cabinets via a suitable networking fabric. Examples of the storage device 200 include non-volatile devices such as but are not limited to, an SSD, a Non-Volatile Dual In-line Memory Module (NVDIMM), a Universal Flash Storage (UFS), a Secure Digital (SD) device, and so on.

The SSD 100 may include a controller 120 (e.g., SoC controller), an internal memory (not shown) and/or an external memory 160. In some arrangements, the external memory 160 may include a random access memory which is a volatile memory, for example, DRAM (Dynamic Random Access Memory). In some arrangements, the controller 120 may include the internal memory which includes a random access memory such as SRAM (Static Random Access Memory).

The SSD 100 includes, for example, the controller 120 and a non-volatile memory (e.g., flash memory) 150 as non-volatile memory (e.g., a NAND type flash memory). The controller 120 may include processors, microcontrollers, central processing units (CPUs), caches, and/or buffers (e.g., buffers). The controller 120 includes, for example, a flash memory interface, and a DRAM interface, a host interface 110, all of which may be interconnected via a bus (not shown). The DRAM interface may function as a DRAM controller configured to control an access to the DRAM in the external memory. The flash memory interface may function as a flash memory control circuit (e.g., NAND control circuit) configured to control the flash memory 150 (e.g., NAND type flash memory). The controller 120 may be configured to perform various processes by executing a control program (e.g., firmware) stored in, for example, a ROM (not shown). In some arrangements, the controller 120 may include a command controller 124 configured to perform a command control to execute command processing for processing various commands received from an information processing apparatus (e.g., a host computer). In some arrangements, the controller 120 may include a memory controller 128 configured to control the internal memory (not shown) and/or the external memory 160.

In some arrangements, the controller 120 may include a flash translation layer (FTL) 130 configured to execute data management and block management of the flash memory 150. The FTL 130 may include a look-up table controller 134, a garbage collection controller 138, a wear leveling controller 136, and a flash memory controller 132. The data management may include management of mapping information indicating a correspondence relationship between a logical address (e.g., LBA (logical block address)) and a physical address of the flash memory 150. In some arrangements, the look-up table controller 134 may execute management of mapping between (1) each logical block address (LBA) or each logical page address and (2) each physical address using an address translation table (logical/physical address translation table). The garbage collection controller 138 may execute garbage collection (GC) which is a process executed to generate a free block as a data write destination block. The wear leveling controller 136 may execute wear leveling which is a process of leveling the number of times of block erasure so that by preventing an occurrence of blocks with a larger number of erasures, the failure probability of the SSD 100 can be reduced. The flash memory controller 132 may execute control of a flash memory interface to control the flash memory 150.

In some arrangements, the flash memory or NVM 150 may include a memory cell array which includes a plurality of flash memory blocks (e.g., NAND blocks). Each of the blocks may function as an erase unit. Each of the blocks includes a plurality of physical pages. In some arrangements, in the flash memory 150, data reading and data writing are executed on a page basis, and data erasing is executed on a block basis. In some arrangements, the NAND memory cell array 150 may include one or more of the NAND flash dies, which are NVM capable of retaining data without power. Each of the dies in the NAND memory cell array may have one or more planes. Each plane has multiple blocks, and each block has multiple pages. The dies can be arranged in one or more memory communication channels connected to the controller 120.

In some arrangements, The FTL 130 may include a superblock manager 135 configured to manage forming and maintaining the superblocks in the manner described herein. For example, the superblock manager 135 can form superblocks from the dies of the NVM 150 by selecting or reselecting block locations (e.g., those dies of the NVM 150 or planes thereof) that form the superblocks. The superblock manager 135 can be implemented using the processing and memory capabilities of the controller 120. The superblock manager 135 can be firmware or software or hardware running on the controller 120 and stored as codes in one or more suitable non-transitory memory devices. In some examples, the superblock manager 135 stores a list of blocks (e.g., a list of physical addresses of the blocks) for each superblock in a local memory and/or in the non-volatile memory 150.

While the NVM or memory cell array 150 can be implemented as NAND dies, other examples of non-volatile memory technologies for implementing the NVM 150 include but are not limited to, Magnetic Random Access Memory (MRAM), Phase Change Memory (PCM), Ferro-Electric RAM (FeRAM), Resistive RAM (ReRAM), and so on that have locations for forming a superblock. The superblock management mechanisms described herein can be likewise implemented on memory systems using such memory technologies and other suitable memory technologies.

The controller 120 may include an interface controller 122 configured to control the host interface 110. The interface controller 122 may function as a circuit which receives various requests from the host 101 and transmits responses to the requests to the host 101. The requests may include various commands such as an I/O command and a control command. The I/O command may include, for example, a write command, a read command, a trim command (unmap command), a format command, and a flush command. A command to write data ("host write data") is called a "write command" at the host interface. Only once the host write data is aggregated into the size required to form a program unit on the NAND does a program command result. The format command may be a command for unmapping the entire memory system (SSD 100).

Figure 2:
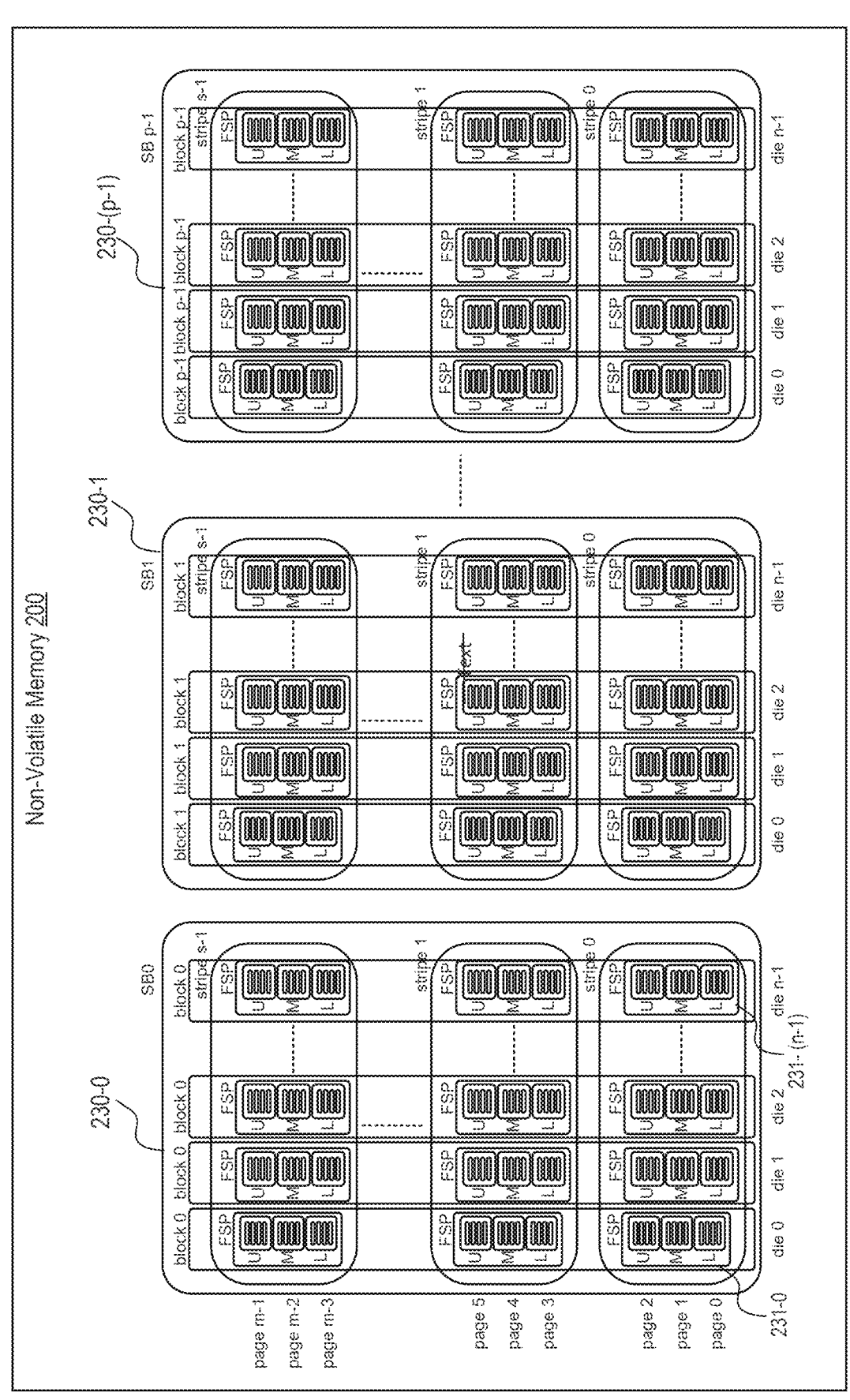
FIG. 2 is a schematic diagram illustrating an example of a plurality of superblocks in a storage device, according to some arrangements.

FIG. 2 is a schematic diagram illustrating an example of a plurality of superblocks 230-0, 230-1, . . . , 230-(p−1) in a storage device, according to some arrangements. Referring to FIG. 2, an NVM 200 may include a plurality of dies such as die 0, die 1, . . . , die (n−1) where n is an integer greater than 0. For example, the NVM 150 can be implemented as the NVM 200. As shown in FIG. 2, the plurality of dies include p blocks such as block 0, block 1, . . . , block (p-1) where p is an integer greater than 0. The p blocks are shown for illustrative purposes. It should be understood that a die may have any number of blocks. In some arrangements, a wordline string (WLSTR) represents a minimum number of pages for one full sequence program (FSP) unit in a NAND flash memory. In Triple-Level Cell (TLC) NAND, it includes lower, middle, and upper pages. These pages are written simultaneously in TLC NAND. In some arrangements, a plurality of FSP units 231-0, . . . , 231-(n−1) form a stripe (e.g., stripe 0) across the die of the superblock 230-0. The stripe across all, or a fraction, of the die of a superblock can allow for concurrent program operations on a large number of dies to increase overall SSD performance.

Referring to FIG. 1 and FIG. 2, the superblock manager 135 may select a block from each of the planes to form a superblock. Thus, superblocks 230-0, 230-1, . . . , and 230-(p−1) (collectively 230) are formed. Each of the superblocks 230-0, 230-1, . . . , and 230-(p−1) is formed with a block from each plane of the dies 0 to (n−1). In some arrangements, the host 101 may send a stream of data to the storage device 100 via the host interface 110 to be written to the NVM 150. Data that belongs to the same stream are tagged with the same stream identifier (ID). A stream can be aligned to the size of one or more superblocks. For example, the storage device 100 can declare to the host 101 the size of one or more superblocks (e.g., superblocks 230) formed in the NVM 230. The controller 120 self-orchestrates GC, and the host 101 can provide hints to the storage device 100 to assist the controller 120 with coordinating the GC.

In some arrangements, a storage device (e.g., storage device 100, garbage collection controller 138, controller 120) can perform garbage collection by moving valid user data (also referred to as "valid data") from NAND superblocks (e.g., superblocks 230) that have some obsolete data, into different NAND blocks to generate superblocks that are empty (e.g., there are no valid data in the empty superblocks). Here, valid data refers to data that is currently in use and may not be removed from the flash device. Invalid data refers to data that is no longer of use and may be removed from the flash device. In some arrangements, the storage device can move valid data from a superblock to NAND blocks by temporarily storing the valid data (referred to as "reclaim data") in one or more reclaim data buffers (not shown).

In one aspect, write amplification is an undesirable phenomenon associated with flash memory and SSDs where the actual amount of information physically written to the storage media is a multiple of the logical amount intended to be written. For example, using the NVMe protocol, a host can send multiple different types of host write data (e.g., data from different client applications) and/or multi-command-size write traffic to a storage device (e.g., SSD), and the SSD can store the different types of host data into a single open NAND superblock (e.g., superblock open or available to host writes). Such "mixed data" including different types of host data stored in the superblock may typically be deleted or overwritten at different times which leads to higher write amplification. Some SSD standards can use multiple streams, each stream being mapped to a different superblock to reduce write amplification, but this "isolation" is defined and performed by the host and is not automatically performed by the SSD. Similarly, some specific SSD standards (e.g., multi-physical function NVMe device (MFND) SSDs) can provide an option to isolate data from all clients, but this option can only be used in the specific SSD standards to improve write amplification.

Figure 3:
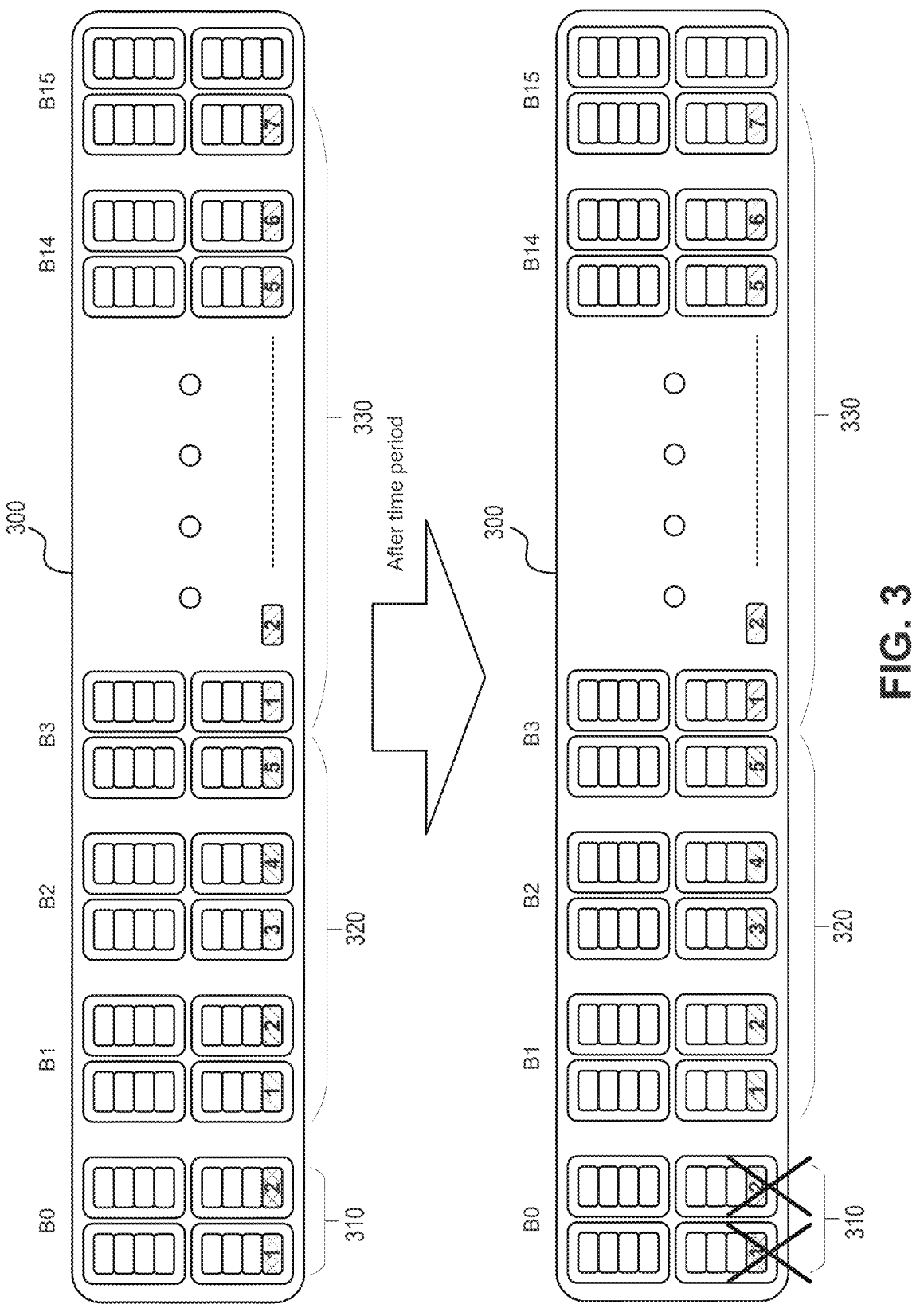
FIG. 3 is a schematic diagram illustrating an example of a single superblock containing mixed data with different types and/or different lifetimes, according to some arrangements.

FIG. 3 is a schematic diagram showing that a single superblock 300 containing mixed data (e.g., data with different types and/or different lifetimes) may cause write amplification. Here, the "lifetime" of write data refers to a duration between a time of initially storing the write data in the NVM (e.g., a superblock) and a time of overwriting or deleting the write data from the NVM (e.g., the same superblock). As shown in the top of FIG. 3, the single superblock 300 contains "mixed" data with three different lifetimes (e.g., data with a first lifetime 310, data with a second lifetime 320, data with a third lifetime 330) among which the first lifetime is smallest. After a time period elapses, as shown in the bottom of FIG. 3, the data with the first lifetime 310 is overwritten or deleted. If wear-levelling does not intervene, garbage collection may select a superblock with the lowest amount of valid data to be reclaimed when the garbage collection determines that it is time to reclaim a superblock. If the data in a superblock have very different lifetimes, then the garbage collection may be forced to select for reclaim superblocks that still contain a fairly large amount of valid data (e.g., data 320 or data 330), because at any particular time most superblocks may have only been partially overwritten or trimmed. Such reclaim of a large amount of valid data may cause high write amplification which may significantly reduce write performance and may reduce the life of the SSD.

To address this problem, according to certain aspects, arrangements in the present disclosure relate to techniques of automatically isolating (or selecting, dividing, separating) different host client's write data (e.g., host client's write data with different types and/or different lifetimes) to program into different NAND superblocks to reduce write amplification. In some arrangements, a storage system (e.g., SSD 100, controller 120, superblock manager 135) can use learning from previous write host data commands and lifetimes of write data in the NAND to direct (or store, send) current host write commands to different superblocks. In some arrangements, the storage system can utilize offline learning or machine learning with previous host write data or lifetime data as training data. In some arrangements, the storage system can program host write data in the same superblock such that all the host write data have similar lifetimes. In this case, the superblock can either be not chosen for reclaim as it contains too much valid data as the lifetime has not yet elapsed, or once that lifetime has been exceeded the superblock will likely have very low valid data and be a good reclaim candidate.

In some arrangements, the storage system can increase the number of open superblocks. For example, the storage system can increase the number of open superblocks to a number smaller than a threshold because it is impractical to have many open superblocks for the following reasons. The more superblocks are open concurrently the less effective over-provisioning (OP) is available, as the storage system is likely maintaining more open superblocks than are strictly necessary to accommodate the incoming host write data rate. OP is a measure of the superblocks available to the system above that number of superblocks that are minimally required to accommodate the capacity of the SSD as presented to the user. A larger amount of OP may translate to a lower write amplification factor (WAF) in any given scenario, as the pressure to reclaim superblocks to make space available for user data can be lower compared to a system with less OP, as in a system with higher OP, each reclaimed superblock is likely to have less valid data compared to a system with lower OP.

In some arrangements, the storage system (e.g., SSD 100, controller 120, FTL 130, or superblock manager 135) can control a front-end of a controller (e.g., interface controller 122 of the SoC controller 120) to direct different types of host write data to different open superblocks. Here, an "open superblock" refers to a superblock to which write data can be currently programmed. As an example, suppose that an SSD might have 4 or 8 open superblocks and there might be up to 32 different clients writing data to the SSD, the front-end of the controller can direct (1) large write commands to a first (open) superblock, (2) commands from a client with a highest small write rate to a second (open) superblock, (3) commands from clients with two lowest write rates to a third (open) superblock, and/or (4) the remaining client data to a fourth (open) superblock.

In some arrangements, a storage system (e.g., SSD 100, controller 120, FTL 130, or superblock manager 135) can use a number of access type inputs associated with particular write data to select which open superblock is used for the particular write data from each command. In some arrangements, the access type inputs may include, but not limited to, (1) a port number (e.g., PCIe (Peripheral Component Interconnect Express) port number), (2) physical function or virtual function (e.g., PCIe physical function or PCIe virtual function, or a number corresponding to a physical or virtual function), (3) namespace (e.g., NVMe namespace, a collection of LBA accessible to host software), (4) a submission queue number, or (5) a number of submission queues currently or recently sending host write commands (e.g., write data from one submission queue commands can be stored into the corresponding one superblock). These access type inputs may relate to how a client can access the particular data on the SSD. For example, the access types can indicate (1) some clients may use one PCIe port, while other clients may use a different PCIe port, (2) one or more clients may be associated to a physical function or a virtual function, (3) clients may store different type of data in different namespaces, (4) each client may use a single submission queue, (5) each client may use multiple submission queues, (6) some clients may use a single submission queue and other clients may use multiple submission queues, or (7) multiple clients may use the same submission queue.

In some arrangements, the storage system can use a number of data characteristic inputs associated with particular write data to select which open superblock is used for the particular write data from each command. The data characteristic inputs may include, but not limited to, (1) host client information (e.g., for some datacenters or storage centers, different host clients may delete or overwrite their data stored in the SSD at different rates), (2) data type information (e.g., for some datacenters or storage centers, different types of data such as JPEG (Joint Photographic Experts Group) photos, simple text message, or database item data, etc. from each client may be deleted or overwritten at different rates), (3) command size information or data size information (e.g., different types of data or different write rates of data can be identified by the size of a write command or the size of write data), (4) write rate information, (5) command types (e.g., if some clients use a "trim" command or a "unmap" command, while other clients do not use them, the clients using the "trim" command or the "unmap" command can be grouped to map write commands to one or more of open superblocks, while the clients that do not use the "trim" command or the "unmap" command can be grouped to map write commands to open superblocks different from the one or more open superblocks), (6) protection information (PI) contained in some write commands (e.g., if some write commands contain PI, while other write commands do not contain PI, the commands containing PI can be mapped to one or more of open superblocks, while write commands that do not contain PI can be mapped to open superblocks different from the one or more open superblocks), or (7) a force unit access flag contained in some write commands (if some write commands contain the force unit access flag, while other write commands do not contain the force unit access flag, write commands containing the force unit access flag can be mapped to one or more of open superblocks, while write commands that do not contain the force unit access flag can be mapped to open superblocks different from the one or more open superblock). Here, the term "client" refers to at least one of (1) different users who have access to different regions of an SSD (e.g., some datacenters may provide an amount of storage to users, typically for a fee, and these users can have different types of electronic data that they want to store; the "lifetime" of the different regions of the SSD can vary, (2) different storage server CPUs (or cores) and clients of these CPUs where the SSD supports dual or multiple ports (e.g., PCIe dual port or multiple ports), (3) different host applications in a datacenter, a storage center, or AI systems, or (4) different instances of the same host application (e.g., multiple clients of the same host application which can serve multiple, different users).

In some arrangements, the storage system can use a combination of one or more of the access type inputs or one or more of the data characteristic inputs, associated with particular write data, to select which open superblock is used for the particular write data from each command (or map/associate the particular write data to an open superblock). For example, write commands can be mapped (or associated) to corresponding open superblock using at least one of (1) host client information (e.g., a client number or a client identifier), (2) data type information, (3) a write command size, (4) a write command rate, (5) command types, (6) protection information (PI) contained in some write commands, (7) a force unit access flag contained in some write commands, (8) a port number, (9) physical function or virtual function (e.g., a PCIe physical function number or a PCIe virtual function number), (10) namespaces, (11) a submission queue number, or (12) a number of submission queues currently or recently sending host write commands. One or more of these criteria can be built up by (1) monitoring, tracking or analyzing host writes (e.g., write commands, write data, host write traffic, etc.) over a period of time, and (2) refining the criteria that have been used to select which open superblock is used for the write data.

In some arrangements, the storage device may learn the lifetime of different write commands and resulting write amplification the SSD by (1) tracking (or monitoring) the lifetime of different sizes of write commands and/or the lifetime of commands from different clients and (2) performing automatic monitoring of resulting write amplification (e.g., monitoring an actual amount of information physically written to the storage media compared to the logical amount intended to be written). In some arrangements, based on the learned lifetime of the commands and learned resulting write amplification, the storage device may automatically modify the configuration of the drive (e.g., NVM or NAND memory cell array). For example, the storage device may either (1) change the number of open superblocks, (2) change the mapping of client write data to different open superblocks, or (3) both.

In some arrangements, the storage device may learn data characteristics and/or access types of different write commands and resulting write amplification the SSD by (1) tracking (or monitoring) the data characteristics and/or access types of write commands from different clients and (2) performing automatic monitoring of resulting write amplification (e.g., monitoring an actual amount of information physically written to the storage media compared to the logical amount intended to be written). The data characteristics of write commands may include (1) host client information, (2) data type information, (3) command size information or data size information, (4) write rate information, (5) command types, (6) protection information (PI) contained in some write commands, (7) a force unit access flag contained in some write commands. The access types of write commands may include (1) a port number (e.g., PCIe port number), (2) physical function or virtual function, (3) namespace, (4) a submission queue number, or (5) a number of submission queues currently or recently sending host write commands. In some arrangements, based on the learned data characteristics and/or access types and learned resulting write amplification, the storage device may automatically modify the configuration of the drive (e.g., NVM or NAND memory cell array). For example, the storage device may either (1) change the number of open superblocks, (2) change the mapping of client write data to different open superblocks, or (3) both.

In some arrangements, the storage device can group write data with similar SSD lifetimes to the same NAND superblock. In some arrangements, the storage device can determine or estimate lifetimes of different pieces of write data, and determine whether a difference between the lifetimes of different pieces of write data is less than or equal to a threshold. In response to determining that the difference between the lifetimes of different pieces of write data is less than the threshold, the storage device can group the different pieces of write data to the same NAND superblock. In response to determining that the difference between the lifetimes of different pieces of write data is greater than the threshold, the storage device can direct or store the different pieces of write data to different NAND superblocks. In this manner, each superblock that is reclaimed can have more invalid data (e.g., more over-written or deleted data). As a result, less superblocks may need to be reclaimed, thereby reducing write amplification. For example, the storage device can determine, based on previous commands data and corresponding lifetime data, a traffic profile where 4 KB data written is over-written more quickly than large sequential write data. Based on the determined traffic profile, the storage device can pack (or store, direct) all the 4 KB traffic into some superblocks (referred to as "4 KB superblocks")

while packing large sequential data into other superblocks (referred to as "large sequential data superblocks"). As a result, the 4 kB superblocks can be reclaimed more quickly than the large sequential data superblocks, and the 4 KB superblocks can have more data overwritten compared to a standard superblock that contains both small and large data writes, thereby reducing write amplification.

In some arrangements, the storage device can determine that a traffic profile of host writes changes (for instance, when new submission queues start sending write data, when some current submission queues stop sending write commands, or when the rate or size of write commands changes from any submission queue). In response to determining that the traffic profile of host writes changes, the storage device can dynamically update the mapping of write commands from different submission queues to different open superblocks to be consistent with the determined changes. For example, when new submission queues start sending write data, the storage device can add (new) mapping between the write data and a new superblock. When some current submission queues stop sending write commands, the storage device can delete mapping between write data from the current submission queues and corresponding superblocks. When the rate or size of write commands changes from any submission queue, the storage device can change mapping between write data from the submission queue and corresponding superblocks.

In one approach, a storage device may include an NVM and a controller. The NVM may include a plurality of blocks grouped into a plurality of superblocks. The plurality of superblocks may include a first superblock and a second superblock. The controller may be configured to receive from a host, a first write command to write first write data and a second write command to write second write data. The controller may be configured to determine a first lifetime of the first write data and a second lifetime of the second write data. The first lifetime may indicate a duration between a time of initially storing the first write data in the NVM and a time of overwriting or deleting the first write data from the NVM, and the second lifetime may indicate a duration between a time of initially storing the second write data in the NVM and a time of overwriting or deleting the second write data from the NVM. The controller may be configured to determine that a difference between the first lifetime and the second lifetime is greater than a threshold. In response to determining that the difference is greater than the threshold, the controller may be configured to program the first write data to the first superblock and the second write data to the second superblock that is different from the first superblock.

In some arrangements, in response to determining that the difference is not greater than the threshold, the controller may be configured to program the first write data and the second write data to an identical superblock among the plurality of superblocks.

In some arrangements, in response to determining that the difference is greater than the threshold, the controller may be configured to determine a plurality of open superblocks among the plurality of superblocks, and select the first superblock and the second superblock from among the plurality of open superblocks.

In some arrangements, the controller may be configured to receive, from the host, a third write command to write third write data. The controller may be configured to determine (or estimate) a third lifetime of the third write data. The third lifetime may indicate a duration between a time of initially storing the third write data in the NVM and a time of overwriting or deleting the third write data from the NVM. In response to determining that a first difference between the third lifetime and the first lifetime is greater than the threshold and that a second difference between the third lifetime and the second lifetime is greater than the threshold, the controller may be configured to program the third write data to a third superblock that is different from the first superblock and the second superblock, among the plurality of superblocks.

In some arrangements, in response to determining that the first difference is greater than the threshold and that the second difference is greater than the threshold, the controller may be configured to increase a number of open superblocks among the plurality of superblocks, and select the third superblock from among the plurality of open superblocks including the increased number of open superblocks.

In some arrangements, in determining (or estimating) the first lifetime and the second lifetime, the controller may be configured to determine a size of the first write data and a size of the second write data. The controller may be configured to determine (or estimate) the first lifetime and the second lifetime such that one write data having a size greater than a size of other write data has a lifetime greater than a lifetime of the other write data.

In some arrangements, in determining (or estimating) the first lifetime and the second lifetime, the controller may be configured to determine a write rate associated with the first write data and a write rate associated with the second write data. The controller may be configured to determine (or estimate) the first lifetime and the second lifetime such that one write data associated with a determined (or estimated) write rate that is higher than a determined (or estimated) write rate associated with other write data has a lifetime different toa lifetime of the other write data. The controller may be configured to determine (or estimate) the write rate associated with the first write data using write commands that have been previously received from the host and have the same characteristics as characteristics of the first write command. The characteristics of the first write command may include at least one of a command type of the first write command, a host application which has issued the first write command, a submission queue associated with the first write command, a namespace associated with the first write command, a port number associated with the first write command, an instance of a host application which has issued the first write command, a client number associated with the first write command, presence of protection information in the first write command, or presence of a force unit access flag in the first write command.

In some arrangements, the controller may be configured to receive from the host, a fourth write command to write fourth write data and a fifth write command to write fifth write data. The controller may be configured to determine (or estimate) a characteristic of the fourth write command and a characteristic of the fifth write command. A characteristic of a write command may include at least one of a command type of the write command, a host application which has issued the write command, a submission queue associated with the write command, a namespace associated with the write command, a port number associated with the write command, an instance of a host application which has issued the write command, a client number associated with the write command, presence of protection information in the write command, or presence of a force unit access flag in the write command. The controller may be configured to determine that the characteristic of the fourth write command is different from the characteristic of the fifth write command. In response to determining that the characteristic of the fourth write command is different from the characteristic of the fifth write command, the controller may be configured to program the fourth write data and the fifth write data to a fourth superblock and a fifth superblock that is different from the fourth superblock, respectively, among the plurality of superblocks.

In some arrangements, the controller may be configured to program write data received through a submission queue to an identical superblock among the plurality of superblocks. The controller may be configured to determine that a size or a write rate of write commands received through the submission queue has been changed. In response to determining that the size or the write rate of the write commands received through the submission queue has been changed, the controller may be configured to program write data received through the submission queue to a superblock that is different from the identical superblock, among the plurality of superblocks.

Arrangements in the present disclosure have at least the following advantages and benefits. First, arrangements in the present disclosure can provide useful techniques for automatically isolating (or selecting, dividing, separating) different host client's write data (e.g., host client's write data with different types and/or different lifetimes) to program into different NAND superblocks to reduce write amplification.

Second, arrangements in the present disclosure can provide useful techniques for determining or estimating lifetimes of different pieces of write data, determining that a difference between the lifetimes of different pieces of write data is less than or equal to a threshold, and grouping the different pieces of write data to the same NAND superblock. In this manner, each superblock that is reclaimed can have more invalid data (e.g., more over-written or deleted data). As a result, less superblocks can be reclaimed, thereby reducing write amplification.

Third, arrangements in the present disclosure can provide useful techniques for learning the lifetime, data characteristics and/or access types of different write commands and resulting write amplification the SSD by (1) tracking (or monitoring) the lifetime, data characteristics and/or access types of different sizes of write commands and/or the lifetime of commands from different clients and (2) performing automatic monitoring of resulting write amplification. Based on the learned lifetime of the commands and learned resulting write amplification, the storage device may automatically modify the configuration of the NVM. In this manner, the storage device can maintain mapping between write data/commands and corresponding superblocks more accurately, thereby more effectively reducing write amplification.

Figure 4:
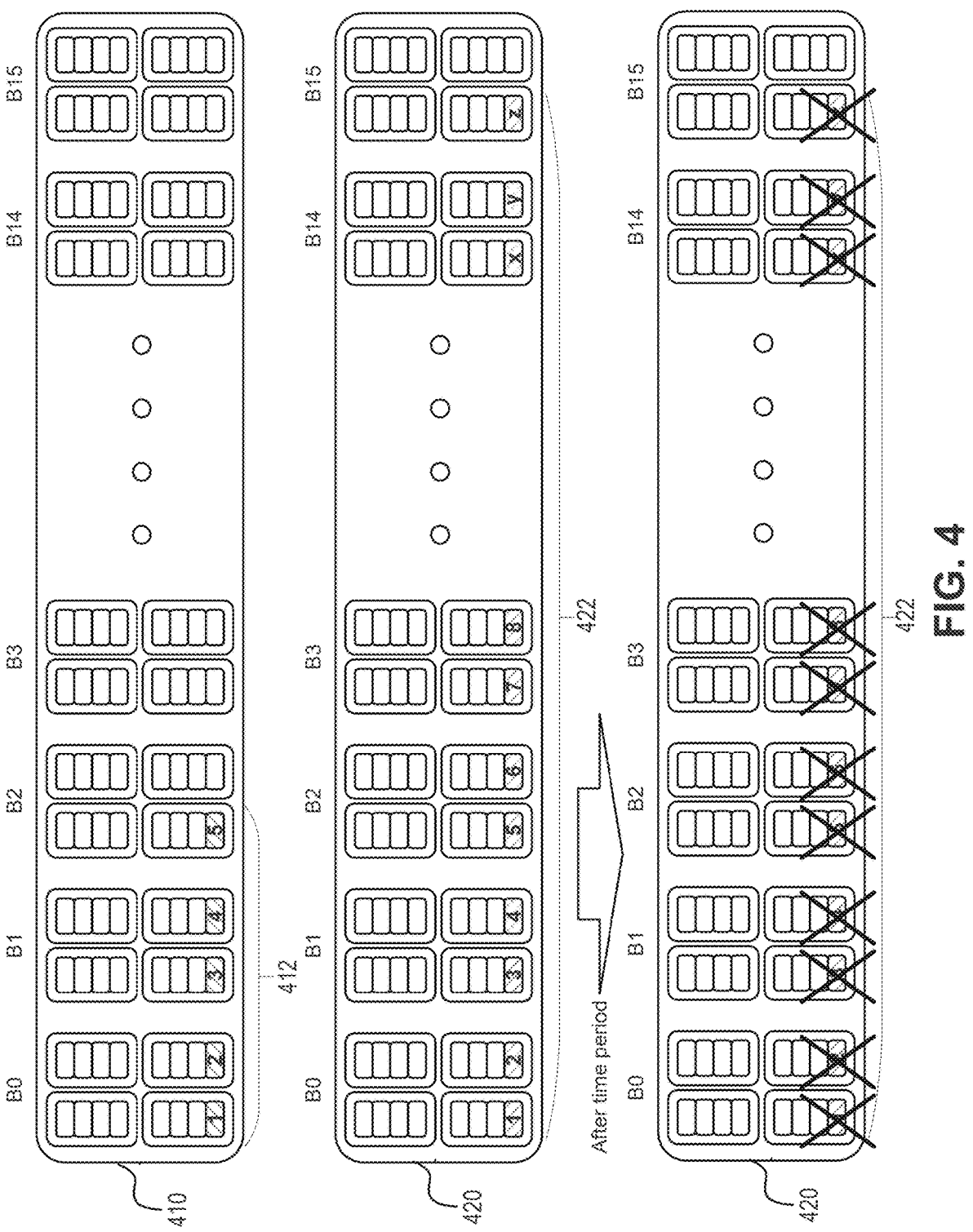
FIG. 4 is a schematic diagram illustrating an example of two superblocks each containing data with the same type and/or the same lifetime (or similar lifetimes), according to some arrangements.

FIG. 4 is a schematic diagram illustrating an example of two superblocks 410 and 420 each containing data with the same type and/or the same lifetime (or similar lifetimes), according to some arrangements. As shown in the top of FIG. 4, each of the superblocks 410 and 420 contains data with the same type and/or the same lifetime (or similar lifetimes). The superblock 410 contains data 412 with the same type and/or the same lifetime (or similar lifetimes), and the superblock 420 contains data 422 with the same type and/or the same lifetime (or similar lifetimes). The data 412 may be of a type (e.g., data characteristics such as size or command type associated with the data 412, or access type such as a port number or a submission queue number with which clients use to access the data 412) different from a type of the data 422. The data 412 may have a lifetime different from a lifetime of the data 422 such that a difference between the lifetime of the data 412 and the lifetime of the data 422 is greater than a threshold). After a time period elapses, as shown in the bottom of FIG. 4, the data 422 is overwritten or deleted. In response to the data 422 being overwritten or deleted, garbage collection is performed to reclaim valid data in the superblock 420. Compared to the superblock 300 shown in FIG. 3, the superblock 420 can have significantly less valid data to be reclaimed than the superblock 300 (or have no valid data to be reclaimed) because each superblock 410, 420 contains data with similar lifetime (or similar type) and such similar data would likely be overwritten or deleted at similar times.

In some arrangements, a storage device (e.g., SSD 100, controller 120, superblock manager 135) may automatically isolate (or select, divide, separate) different host client's write data 412 and 422 (e.g., host client's write data with different types and/or different life times) to program into different NAND superblocks 410 and 420, respectively, to reduce write amplification. The storage system may use learning from previous write host data commands and lifetimes of write data in the NAND to direct (or store, send) current host write commands to different superblocks (e.g., superblocks 410 and 420). The storage system may utilize offline learning or machine learning with previous host write data or lifetime data as training data.

In some arrangements, the storage device may learn the lifetime of different write commands and resulting write amplification the SSD by (1) tracking (or monitoring) the lifetime of different sizes of write commands and/or the lifetime of commands from different clients and (2) performing automatic monitoring of resulting write amplification (e.g., monitoring an actual amount of information physically written to the storage media compared to the logical amount intended to be written). In some arrangements, based on the learned lifetime of the commands and learned resulting write amplification, the storage device may automatically modify the configuration of the drive (e.g., NVM or NAND memory cell array). For example, the storage device may either (1) change the number of open superblocks, (2) change the mapping of client write data to different open superblocks (e.g., mapping between write data 412, 422 and open superblocks 410, 420), or (3) both.

In some arrangements, the storage system may increase the number of open superblocks and control a front-end of a controller (e.g., interface controller 122 of the SoC controller 120) to direct different types of host write data 412, 422 to different open superblocks 410, 420.

In some arrangements, the storage system may use a number of access type inputs associated with particular write data (e.g., write data 412 or 422) to select which open superblock (e.g., open superblock 410 or 420) is used for the particular write data from each command. In some arrangements, the access type inputs may include, but not limited to, (1) a port number, (2) physical function or virtual function, (3) namespace, (4) a submission queue number, or (5) a number of submission queues currently or recently sending host write commands.

In some arrangements, the storage system may use a number of data characteristic inputs associated with particular write data (e.g., write data 412 or 422) to select which open superblock (e.g., open superblock 410 or 420) is used for the particular write data from each command. The data characteristic inputs may include, but not limited to, (1) host client information, (2) data type information, (3) command size information or data size information, (4) write rate information, (5) command types, (6) protection information (PI) contained in some write commands, or (7) a force unit access flag contained in some write commands.

In some arrangements, the storage device may learn data characteristics and/or access types of different write commands and resulting write amplification the SSD by (1) tracking (or monitoring) the data characteristics and/or access types of write commands from different clients and (2) performing automatic monitoring of resulting write amplification (e.g., monitoring an actual amount of information physically written to the storage media compared to the logical amount intended to be written). The data characteristics of write commands may include (1) host client information, (2) data type information, (3) command size information or data size information, (4) write rate information, (5) command types, (6) protection information (PI) contained in some write commands, (7) a force unit access flag contained in some write commands. The access types of write commands may include (1) a port number (e.g., PCIe port number), (2) physical function or virtual function, (3) namespace, (4) a submission queue number, or (5) a number of submission queues currently or recently sending host write commands. In some arrangements, based on the learned data characteristics and/or access types and learned resulting write amplification, the storage device may automatically modify the configuration of the drive (e.g., NVM or NAND memory cell array). For example, the storage device may either (1) change the number of open superblocks, (2) change the mapping of client write data to different open superblocks, or (3) both.

In some arrangements, the storage device can group write data with similar SSD lifetimes (e.g., data pieces 1-5 of the write data 412) to the same NAND superblock (e.g., superblock 410). In some arrangements, the storage device can determine or estimate lifetimes of different pieces of write data (e.g., data pieces 1-5 of the write data 412), and determine whether a difference between the lifetimes of different pieces of write data is less than or equal to a threshold. In response to determining that the difference between the lifetimes of different pieces of write data is less than the threshold, the storage device can group the different pieces of write data (e.g., data pieces 1-5 of the write data 412) to the same NAND superblock (e.g., superblock 410). In response to determining that the difference between the lifetimes of different pieces of write data is greater than the threshold (e.g., a difference between a lifetime of data pieces 1-8 of write data 422 and a lifetime of the data pieces 1-5 of the write data 412 is greater than the threshold), the storage device can direct or store the different pieces of write data (e.g., data pieces 1-8 of write data 422) to different NAND superblocks (e.g., superblock 420 different from superblock 410). In this manner, each superblock that is reclaimed can have more invalid data (e.g., more over-written or deleted data). As a result, less superblocks may need to be reclaimed, thereby reducing write amplification.

FIG. 5 is a flowchart illustrating an example method for automatically isolating write data in a storage device, according to some arrangements. In this example, an automatic isolating process 500 begins in 510 by receiving, from a host (e.g., host 101), a first write command to write first write data (e.g., write data 412) and a second write command to write second write data (e.g., write data 422). The process 500 can be performed by a storage device (e.g., SSD 100) or a controller thereof (e.g., controller 120, superblock manager 135). In some arrangements, the controller may be configured to control an NVM (e.g., NVM 150) including a plurality of blocks grouped into a plurality of superblocks (e.g., superblocks 230-0, 230-1, . . . , 230-(p−1), superblocks 410, 420).

In 520, in some arrangements, the controller may determine a first lifetime of the first write data (e.g., write data 412) and a second lifetime of the second write data (e.g., write data 422). The first lifetime may indicate a duration between a time of initially storing the first write data in the NVM (e.g., in a superblock) and a time of overwriting or deleting the first write data from the NVM (e.g., from that superblock), and the second lifetime may indicate a duration between a time of initially storing the second write data in the NVM (e.g., in a superblock) and a time of overwriting or deleting the second write data from the NVM (e.g., from that superblock).

In some arrangements, in determining (or estimating) the first lifetime and the second lifetime, a write rate associated with the first write data (e.g., how frequently write data 412 is written or overwritten on the SSD) and a write rate associated with the second write data (e.g., how frequently write data 422 is written or overwritten on the SSD) may be determined (or estimated). The first lifetime and the second lifetime may be determined (or estimated) such that one write data associated with a determined (or estimated) write rate that is higher than a determined (or estimated) write rate associated with other write data has a lifetime different to a lifetime of the other write data. For example, if the write data 422 is written or overwritten on the SSD more frequently than the write data 412, the lifetime of the write data 422 may be shorter than the lifetime of the write data 412.

In some arrangements, in determining (or estimating) the first lifetime and the second lifetime, a size of the first write data and a size of the second write data may be determined. The first lifetime and the second lifetime may be determined (or estimated) such that one write data having a size greater than a size of other write data has a lifetime greater than a lifetime of the other write data. For example, if the size of the write data 422 is greater than the write data 412, the lifetime of the write data 422 may be greater or longer than the lifetime of the write data 412.

In 530, in some arrangements, the controller may determine that a difference between the first lifetime and the second lifetime is greater than a threshold. In 540, in some arrangements, in response to determining that the difference is greater than the threshold (e.g., the first life time and the second lifetime are sufficiently different), the controller may program the first write data (e.g., write data 412) to a first superblock (e.g., superblock 410) of the plurality of superblocks and the second write data (e.g., write data 422) to a second superblock (e.g., superblock 420) of the plurality of superblocks that is different from the first superblock. In some arrangements, in response to determining that the difference is not greater than the threshold (e.g., a difference between lifetimes of data pieces 1-5 of the write data 412 is sufficiently similar), the first write data and the second write data (e.g., data pieces 1-5 of the write data 412) may be programmed to an identical superblock (e.g., superblock 410) among the plurality of superblocks.

In some arrangements, in programming the first write data and the second write data, in response to determining that the difference is greater than the threshold, a plurality of open superblocks may be determined among the plurality of superblocks. The first superblock (e.g., superblock 410) and the second superblock (e.g., superblock 420) may be selected from among the plurality of open superblocks.

In some arrangements, a third write command to write third write data may be received from the host. A third lifetime of the third write data may be determined (or estimated). The third lifetime may indicate a duration between a time of initially storing the third write data in the NVM and a time of overwriting or deleting the third write data from the NVM. In response to determining that a first difference between the third lifetime and the first lifetime (e.g., lifetime of write data 412) is greater than the threshold and that a second difference between the third lifetime and the second lifetime (e.g., lifetime of write data 422) is greater than the threshold, the third write data may be programmed to a third superblock that is different from the first superblock (e.g., superblock 410) and the second superblock (e.g., superblock 420), among the plurality of superblocks. In some arrangements, in programming the third write data to the third superblock, in response to determining that the first difference is greater than the threshold and that the second difference is greater than the threshold, a number of open superblocks among the plurality of superblocks may be increased. The third superblock may be selected from among the plurality of open superblocks including the increased number of open superblocks.

In some arrangements, the write rate associated with the first write data (e.g., write data 412) may be determined (or estimated) using write commands that have been previously received from the host and have the same characteristics as characteristics of the first write command. The characteristics of the first write command may include at least one of a command type of the first write command (e.g., if some clients use a "trim" command or a "unmap" command, while other clients do not use them, the clients using the "trim" command or the "unmap" command can be grouped to map write commands to one or more of open superblocks, while the clients that do not use the "trim" command or the "unmap" command can be grouped to map write commands to open superblocks different from the one or more open superblocks), a host application which has issued the first write command (e.g., write commands issued from different host applications may be mapped to different superblocks), a submission queue (e.g., submission queue 102) associated with the first write command, a namespace associated with the first write command, a port number associated with the first write command (e.g., PCIe port number), an instance of a host application which has issued the first write command (e.g., write commands issued from instances of the same host application may be mapped to the same superblock), a client number (e.g., client identifier) associated with the first write command, presence of protection information (PI) in the first write command (e.g., if some write commands contain PI, while other write commands do not contain PI, the commands containing PI can be mapped to one or more of open superblocks, while write commands that do not contain PI can be mapped to open superblocks different from the one or more open superblocks), or presence of a force unit access flag in the first write command (if some write commands contain the force unit access flag, while other write commands do not contain the force unit access flag, write commands containing the force unit access flag can be mapped to one or more of open superblocks, while write commands that do not contain the force unit access flag can be mapped to open superblocks different from the one or more open superblock).

In some arrangements, a fourth write command to write fourth write data (e.g., write data 412) and a fifth write command to write fifth write data (e.g., write data 422) may be received from the host (e.g., host 101). A characteristic of the fourth write command and a characteristic of the fifth write command may be determined (or estimated). A characteristic of a write command may include at least one of a command type of the write command, a host application which has issued the write command, a submission queue associated with the write command, a namespace associated with the write command, a port number associated with the write command, an instance of a host application which has issued the write command, a client number associated with the write command, presence of protection information in the write command, or presence of a force unit access flag in the write command. It may be determined that the characteristic of the fourth write command is different from the characteristic of the fifth write command. In response to determining that the characteristic of the fourth write command is different from the characteristic of the fifth write command, the fourth write data (e.g., write data 412) and the fifth write data (e.g., write data 422) may be programmed to a fourth superblock (e.g., superblock 410) and a fifth superblock (e.g., superblock 420) that is different from the fourth superblock, respectively, among the plurality of superblocks.

In some arrangements, write data received through a submission queue (e.g., submission queue 102) may be programmed to an identical superblock (e.g., superblock 410) among the plurality of superblocks. It may be determined that a size or a write rate of write commands received through the submission queue has been changed. In response to determining that the size or the write rate of the write commands received through the submission queue has been changed, write data received through the submission queue may be programmed to a superblock (e.g., superblock 420) that is different from the identical superblock, among the plurality of superblocks.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. The functions implemented in software may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A storage device, comprising:
a non-volatile memory (NVM) comprising a plurality of blocks grouped into a plurality of superblocks, wherein the plurality of superblocks comprises a first superblock and a second superblock; and
a controller configured to:
identify one or more isolation regions comprising superblocks specified by a host, wherein the first superblock and the second superblock do not belong to the one or more isolation regions;
receive from the host, a first write command to write first write data and a second write command to write second write data;
determine that the first write data and the second write data are not to be mapped to the one or more isolation regions;
determine a first lifetime of the first write data and a second lifetime of the second write data;
determine that a difference between the first lifetime and the second lifetime is greater than a threshold; and
in response to determining that the difference is greater than the threshold, and in response to determining that the first write data and the second data are not to be written to the one or more isolation regions, program the first write data to the first superblock and the second write data to the second superblock that is different from the first superblock.

2. The storage device of claim 1, wherein the controller is configured to:
in response to determining that the difference is not greater than the threshold, program the first write data and the second write data to an identical superblock among the plurality of superblocks.

3. The storage device of claim 1, wherein in response to determining that the difference is greater than the threshold, the controller is configured to:

determine a plurality of open superblocks among the plurality of superblocks; and select the first superblock and the second superblock from among the plurality of open superblocks.

4. The storage device of claim 1, wherein the controller is configured to:

receive, from the host, a third write command to write third write data;

determine a third lifetime of the third write data, wherein the third lifetime indicates a duration between a time of initially storing the third write data in the NVM and a time of overwriting or deleting the third write data from the NVM; and in response to determining that a first difference between the third lifetime and the first lifetime is greater than the threshold and that a second difference between the third lifetime and the second lifetime is greater than the threshold, program the third write data to a third superblock that is different from the first superblock and the second superblock, among the plurality of superblocks.

5. The storage device of claim 1, wherein in response to determining that the first difference is greater than the threshold and that the second difference is greater than the threshold, the controller is configured to:

increase a number of open superblocks among the plurality of superblocks; and select the third superblock from among the plurality of open superblocks including the increased number of open superblocks.

6. The storage device of claim 1, wherein the first lifetime indicates a duration between a time of initially storing the first write data in the NVM and a time of overwriting or deleting the first write data from the NVM, and the second lifetime indicates a duration between a time of initially storing the second write data in the NVM and a time of overwriting or deleting the second write data from the NVM, and in determining the first lifetime and the second lifetime, the controller is configured to:

determine a size of the first write data and a size of the second write data; and determine the first lifetime and the second lifetime such that one write data having a size greater than a size of other write data has a lifetime different to a lifetime of the other write data.

7. The storage device of claim 1, wherein in determining the first lifetime and the second lifetime, the controller is configured to:

determine a write rate associated with the first write data and a write rate associated with the second write data; and determine the first lifetime and the second lifetime such that one write data associated with a determined write rate that is higher than a determined write rate associated with other write data has a lifetime different to a lifetime of the other write data.

8. The storage device of claim 7, wherein the controller is configured to determine the write rate associated with the first write data using write commands that have been previously received from the host and have the same characteristics as characteristics of the first write command, and the characteristics of the first write command comprise at least one of a command type of the first write command, a host application which has issued the first write command, a submission queue associated with the first write command, a namespace associated with the first write command, a port number associated with the first write command, an instance of a host application which has issued the first write command, a client number associated with the first write command, presence of protection information in the first write command, or presence of a force unit access flag in the first write command.

9. The storage device of claim 1, wherein the controller is further configured to:

receive from the host, a fourth write command to write fourth write data and a fifth write command to write fifth write data;

determine a characteristic of the fourth write command and a characteristic of the fifth write command, wherein a characteristic of a write command comprises at least one of a command type of the write command, a host application which has issued the write command, a submission queue associated with the write command, a namespace associated with the write command, a port number associated with the write command, an instance of a host application which has issued the write command, a client number associated with the write command, presence of protection information in the write command, or presence of a force unit access flag in the write command;

determine that the characteristic of the fourth write command is different from the characteristic of the fifth write command; and in response to determining that the characteristic of the fourth write command is different from the characteristic of the fifth write command, program the fourth write data and the fifth write data to a fourth superblock and a fifth superblock that is different from the fourth superblock, respectively, among the plurality of superblocks.

10. The storage device of claim 1, wherein the controller is configured to:

program write data received through a submission queue to an identical superblock among the plurality of superblocks;

determine that a size or a write rate of write commands received through the submission queue has been changed; and in response to determining that the size or the write rate of the write commands received through the submission queue has been changed, program write data received through the submission queue to a superblock that is different from the identical superblock, among the plurality of superblocks.

11. A method comprising:

receiving, from a host by a controller configured to control a non-volatile memory (NVM) comprising a plurality of blocks grouped into a plurality of superblocks, a first write command to write first write data and a second write command to write second write data;

identifying one or more isolation regions comprising superblocks specified by the host, wherein the first superblock and the second superblock do not belong to the one or more isolation regions;

determining, by the controller, a first lifetime of the first write data and a second lifetime of the second write data;

determining, by the controller, that the first write data and the second write data are not to be mapped to the one or more isolation regions;

determining, by the controller, that a difference between the first lifetime and the second lifetime is greater than a threshold; and in response to determining that the difference is greater than the threshold, and in response to determining that the first write data and the second data are not to be written to the one or more isolation regions, programming the first write data to a first superblock of the plurality of superblocks and the second write data to a second superblock of the plurality of superblocks that is different from the first superblock.

12. The method of claim 11, further comprising:

in response to determining that the difference is not greater than the threshold, programming the first write data and the second write data to an identical superblock among the plurality of superblocks.

13. The method of claim 11, wherein programming the first write data and the second write data comprises in response to determining that the difference is greater than the threshold:

determining a plurality of open superblocks among the plurality of superblocks; and selecting the first superblock and the second superblock from among the plurality of open superblocks.

14. The method of claim 11, further comprising:

receiving, from the host, a third write command to write third write data;

determining a third lifetime of the third write data, wherein the third lifetime indicates a duration between a time of initially storing the third write data in the NVM and a time of overwriting or deleting the third write data from the NVM; and in response to determining that a first difference between the third lifetime and the first lifetime is greater than the threshold and that a second difference between the third lifetime and the second lifetime is greater than the threshold, programming the third write data to a third superblock that is different from the first superblock and the second superblock, among the plurality of superblocks.

15. The method of claim 11, wherein programming the third write data to the third superblock comprises in response to determining that the first difference is greater than the threshold and that the second difference is greater than the threshold:

increasing a number of open superblocks among the plurality of superblocks; and selecting the third superblock from among the plurality of open superblocks including the increased number of open superblocks.

16. The method of claim 11, wherein the first lifetime indicates a duration between a time of initially storing the first write data in the NVM and a time of overwriting or deleting the first write data from the NVM, and the second lifetime indicates a duration between a time of initially storing the second write data in the NVM and a time of overwriting or deleting the second write data from the NVM, and determining the first lifetime and the second lifetime comprises:

determining a size of the first write data and a size of the second write data; and determining the first lifetime and the second lifetime such that one write data having a size greater than a size of other write data has a lifetime different to a lifetime of the other write data.

17. The method of claim 11, wherein determining the first lifetime and the second lifetime comprises:

determining a write rate associated with the first write data and a write rate associated with the second write data; and determining the first lifetime and the second lifetime such that one write data associated with a determined write rate that is higher than a determined write rate associated with other write data has a lifetime different to a lifetime of the other write data.

18. The method of claim 17, wherein the write rate associated with the first write data is determined using write commands that have been previously received from the host and have the same characteristics as characteristics of the first write command, and the characteristics of the first write command comprise at least one of a command type of the first write command, a host application which has issued the first write command, a submission queue associated with the first write command, a namespace associated with the first write command, a port number associated with the first write command, an instance of a host application which has issued the first write command, a client number associated with the first write command, presence of protection information in the first write command, or presence of a force unit access flag in the first write command.

19. The method of claim 11, further comprising:

receiving from the host, a fourth write command to write fourth write data and a fifth write command to write fifth write data;

determining a characteristic of the fourth write command and a characteristic of the fifth write command, wherein a characteristic of a write command comprises at least one of a command type of the write command, a host application which has issued the write command, a submission queue associated with the write command, a namespace associated with the write command, a port number associated with the write command, an instance of a host application which has issued the write command, a client number associated with the write command, presence of protection information in the write command, or presence of a force unit access flag in the write command;

determining that the characteristic of the fourth write command is different from the characteristic of the fifth write command; and in response to determining that the characteristic of the fourth write command is different from the characteristic of the fifth write command, programming the fourth write data and the fifth write data to a fourth superblock and a fifth superblock that is different from the fourth superblock, respectively, among the plurality of superblocks.

20. The method of claim 11, further comprising:

programming write data received through a submission queue to an identical superblock among the plurality of superblocks;

determining that a size or a write rate of write commands received through the submission queue has been changed; and in response to determining that the size or the write rate of the write commands received through the submission queue has been changed, programming write data received through the submission queue to a superblock that is different from the identical superblock, among the plurality of superblocks.

* * * * *